Oct. 20, 1931.  A. LIETZ  1,828,194

TRANSPARENT MARINER'S COMPASS

Filed April 11, 1927

INVENTOR.
Adolph Lietz.
BY
Carlos P. Griffin
ATTORNEY.

Patented Oct. 20, 1931

1,828,194

UNITED STATES PATENT OFFICE

ADOLPH LIETZ, OF SAN FRANCISCO, CALIFORNIA

TRANSPARENT MARINER'S COMPASS

Application filed April 11, 1927. Serial No. 182,558.

This invention relates to a mariner's compass and its object is to provide an expansion chamber for the liquid used in such a compass which will be of sufficient capacity in combination with a damping cap, to prevent any slight, or even considerable disturbance of the compass from dislodging or interfering with the compass card.

It will be understood by those familiar with compasses of this character that in the ordinary mariner's compass the bowl containing the compass card is filled with a high grade alcohol spirit, and that unless some special means is provided, any jar given the compass bowl will tend to cause the compass card to float off its support and thereby interfere with the proper operation and convenient reading of the card as a direction indicator.

Another object of the invention is to so arrange the expansion chamber used as to prevent any interference with the light which is placed below the compass, to thereby prevent accidental misreading of the compass.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1:
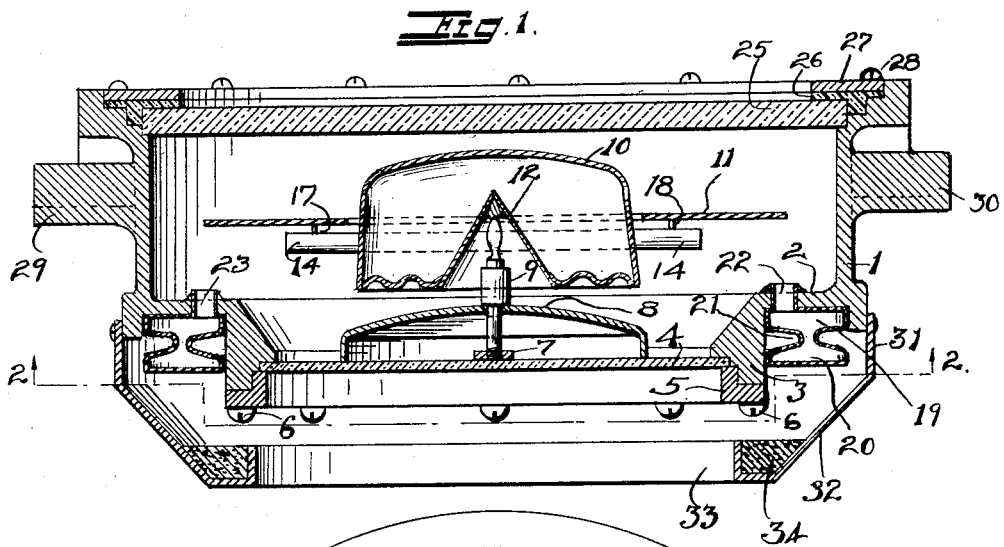
Figure 1 is a vertical sectional view through the compass bowl showing the gimbal supports for the same.
Figure 2:
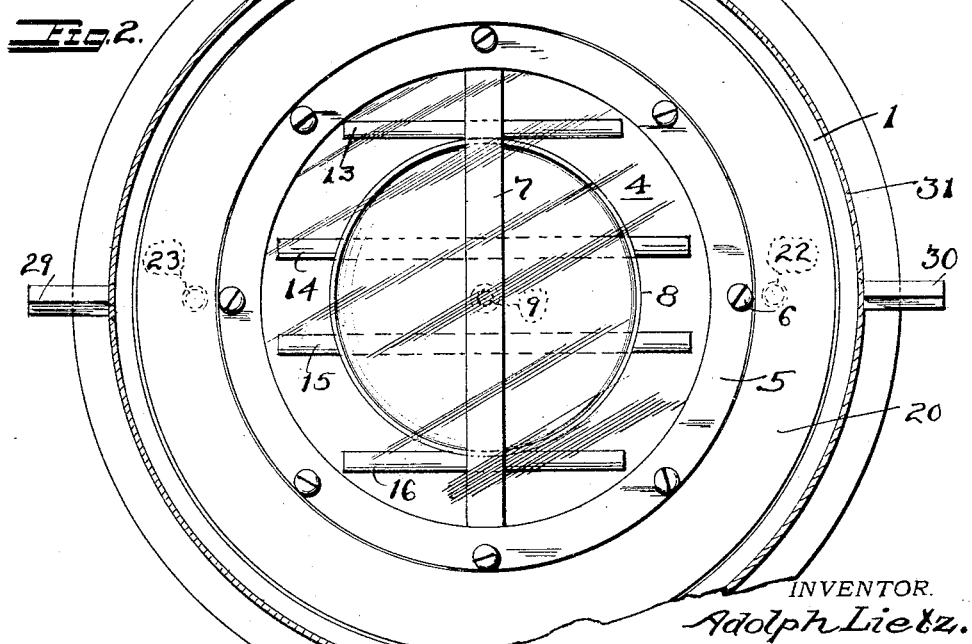
Figure 2 is a bottom plan view of the compass bowl taken with the lower portion thereof cut away, as indicated by the line 2—2 Figure 1, the gimbal supports for the bowl being also shown.

The compass bowl is indicated at 1, and consists of a cylindrical shell with an inturned flange 2 forming a portion of the bottom, and which flange is in turn downwardly turned, as indicated at 3, to form a mounting for the bottom glass 4, said glass being held in place by the ring 5 which is secured to the flange 3 by means of several screws 6, a liquid tight joint being produced by the flange 3, the glass 4 and the ring 5.

A bar 7 is secured to the inside of the flange 3, and rests upon the top of the glass 4, said bar also supporting the compass pivot 9. A shallow convex shell 8, or it might be a solid body except that the weight would be thereby increased, serves to reduce the quantity of free liquid under the card and thereby prevents pulsations of the liquid from occurring to an extent likely to unseat the card.

The compass is of any well-known type for this particular work, and consists of the float 10, compass card 11, float bearing cone 12, and a plurality of tubes 13, 14, 15 and 16 within which the compass needles are mounted.

The tubes are connected to the card 11 by means of small wires 17 and 18 in each instance, and the weight of the compass card when immersed in the liquid used in the compass box is very nicely regulated to about 60–90 grains when immersed to give the compass card the necessary stability while at the same time reducing the weight on the needle point to a minimum.

Surrounding the flange 3 just under the bowl is a double expansion ring made up of a top chamber 19 and a bottom chamber 20 connected thereto. These chambers are each complete circles and are formed of thin sheet metal so as to give the desired flexibility. The material of which said chambers are made usually being spring copper or brass, and the annulus thus produced is connected to the compass flange 2 by means of two tubes 22 and 23 which are soldered to the compass flange to make a perfectly liquid tight joint, said tubes allowing the liquid to pass into and out the expansion chamber.

The compass is covered with a glass 25 which is held in place by means of a gasket 26, and flat ring 27, the latter being held in place by the screws 28.

At the sides of the compass there are two integral gimbal arms 29 and 30 to permit the compass to be supported in gimbal rings to hold the compass level at all times.

In order to weight the compass bowl to hold it level there is a shield depending therefrom as indicated at 31 with an inturned flange 32, the lower edge of which is upturned as indicated at 33 to form a receptacle for an annular mass of lead or other material, as indicated at 34. This weight lowers the center of gravity of the compass bowl and makes it stand level in the gimbal rings with more stability.

In actual practice a lamp of some kind is placed so that its rays will shine through the compass and thereby enable the mariner to determine the bearing of the card at any moment without the aid of any outside light.

Should any jar strike the compass bowl the movement of the liquid will be taken up by the aid of the expansion rings forming the chambers 19 and 20. Since the quantity of liquid under the float 10 and over the shell 8 is small there will be less tendency of the liquid inside the bowl to move in such a way as to dislodge the card from its proper position.

Neither the expansion ring nor the shield 8 alone will reduce the card flotation when the compass bowl is jarred heavily.

Having thus described my invention, what I desire to secure by Letters Patent of the United States is as follows, but modifications may be made in carrying out the invention as shown in the drawings and in the above particularly described form thereof, within the purview of the annexed claims.

1. In a mariner's compass of the class described comprising a cylindrical shell having an inturned flange, a cylindrical shell of smaller diameter depending from said flange, a glass plate cover on the bottom of said smaller shell, a ring for retaining said glass plate, a transverse bar on the upper side of said glass plate and secured to said smaller shell, a compass pivot mounted on said bar, a float mounted on said pivot, a convex body approximately the same diameter of said float under said float, a compass card and magnets on said float, a double annular expansion chamber mounted on the outside of said small shell and under said inturned flange, open tubes in said flange and fixed to said expansion chamber.

2. In a mariner's compass of the class described, a spirit chamber having a diametrically reduced depressed bottom portion, transparent covers sealed in the top and bottom of said chamber, an external annular expansion chamber surrounding said reduced bottom portion and communicating into said spirit chamber, a compass float pivoted above said depressed bottom portion, and a shield beneath said float.

3. In a mariner's compass of the class described, a spirit chamber with a transparent cover and having a diametrically reduced depressed bottom portion with a transparent central shield to form a spirit chamber with a transparent bottom, a pivot on said shield, a compass float pivoted on said pivot, and an external expansion chamber surrounding said reduced portion and communicating with said spirit chamber.

In testimony whereof I have hereunto set my hand this 6th day of April, A. D. 1927.

ADOLPH LIETZ.